(12) United States Patent
Tangen et al.

(10) Patent No.: US 8,966,357 B2
(45) Date of Patent: *Feb. 24, 2015

(54) USER INTERFACE FOR ESTABLISHING MAPPINGS FROM INTERNAL METADATA TO EXTERNAL METADATA

(75) Inventors: Paul Tangen, Milford, CT (US); Sekhar Marasanapalle, Norwalk, CT (US); Hugh Wallis, Ontario (CA); Carlos R. Rivas, Norwalk, CT (US)

(73) Assignee: Oracle International Corporation, Redwood Shores, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/044,146

(22) Filed: Mar. 9, 2011

(65) Prior Publication Data
US 2011/0161373 A1 Jun. 30, 2011

Related U.S. Application Data

(63) Continuation of application No. 10/692,525, filed on Oct. 24, 2003, now Pat. No. 7,908,548.

(51) Int. Cl.
*G06F 17/00* (2006.01)
*G06F 17/30* (2006.01)

(52) U.S. Cl.
CPC .... *G06F 17/30997* (2013.01); *G06F 17/30569* (2013.01)
USPC ............ 715/212; 715/203; 715/273; 715/234

(58) Field of Classification Search
CPC .............. G06F 17/211; G06F 11/3079; G06F 11/3086; G06F 11/3068; G06F 11/3072
USPC .................. 715/216–229, 234, 212, 203, 273
See application file for complete search history.

(56) References Cited

U.S. PATENT DOCUMENTS

| | | | |
|---|---|---|---|
| 6,418,400 B1 | 7/2002 | Webber | |
| 6,920,608 B1 | 7/2005 | Davis | |
| 7,908,548 B2 | 3/2011 | Tangen et al. | |
| 2003/0037038 A1 | 2/2003 | Block et al. | |
| 2003/0041077 A1* | 2/2003 | Davis et al. | 707/500 |
| 2004/0122844 A1 | 6/2004 | Malloy et al. | |
| 2004/0210838 A1 | 10/2004 | Wason | |

(Continued)

OTHER PUBLICATIONS

Witkowski, A., et al. "Spreadsheets in RDBMS for OLAP", Proceedings of the 2003 ACM SIGMOD International Conference on Management of Data, San Diego CA, 2003, ACM Press, cover page and pp. 52-63.

(Continued)

*Primary Examiner* — Quoc A Tran
(74) *Attorney, Agent, or Firm* — Kilpatrick Townsend & Stockton LLP

(57) ABSTRACT

A solution is provided that allows a user to provide an alternate set of metadata for any number of data points within a report, while in a report design environment. They may lay down a grid on the work area and specify the data by placing the relevant dimensional metadata, extracted from the source, in the grid as row headings and column headings. The user may then select either a column or a row from the grid and upon doing so may be provided with a mechanism to define alternate metadata that can describe all data points that are in the column or row in the target system. This allows for a much more user-friendly environment in which to specify metadata mappings between internal sources and external sources.

27 Claims, 9 Drawing Sheets

(56) References Cited

U.S. PATENT DOCUMENTS

2005/0182777 A1* 8/2005 Block et al. .................. 707/100
2009/0138789 A1   5/2009 Tangen et al.

OTHER PUBLICATIONS

Notice of Allowance of Nov. 10, 2010 for U.S. Appl. No. 10/692,525, 19 pages.
Non-Final Office Action of Dec. 30, 2009 for U.S. Appl. No. 10/692,525, 27 pages.
Final Office Action of Jun. 23, 2009 for U.S. Appl. No. 10/692,525, 36 pages.
Non-Final Office Action of Dec. 22, 2008 for U.S. Appl. No. 10/692,525, 33 pages.
Final Office Action of Aug. 8, 2008 for U.S. Appl. No. 10/692,525, 43 pages.
Non-Final Office Action of Jan. 8, 2008 for U.S. Appl. No. 10/692,525, 28 pages.
Final Office Action of Sep. 11, 2007 for U.S. Appl. No. 10/692,525, 19 pages.
Final Office Action of Jan. 23, 2007 for U.S. Appl. No. 10/692,525, 19 pages.
Non-Final Office Action of Jul. 21, 2006 for U.S. Appl. No. 10/692,525, 13 pages.
Non-Final Office Action of Mar. 20, 2006 for U.S. Appl. No. 10/692,525, 11 pages.

* cited by examiner

USER INTERFACE FOR ESTABLISHING MAPPINGS FROM INTERNAL METADATA TO EXTERNAL METADATA

FIELD OF THE INVENTION

The present invention relates to the field of computer databases. More specifically, the present invention relates to a user interface for establishing mappings from internally defined and/or provided metadata to externally defined and/or provided metadata in a report design environment.

BACKGROUND OF THE INVENTION

Database applications are commonly used to store large amounts of data. Modern databases often also track metadata, or data about the data, to further improve storage capabilities and searchability. Users may access the databases for a variety of different uses, but one popular use is to generate reports based on the data and metadata in a database.

Typical report generators operate as part of the database package. As such, they are designed to allow users to access and perform functions on internal metadata. Internal metadata is metadata that is either defined by the user of the report generator, or provided in the database associated with the database package.

It may be useful, however, to provide access to both internal and external metadata within a report generator. One example of this is in the case of Extensible Business Reporting Lanugage (XBRL). XBRL is based on the Extensible Markup Language (XML), and is specifically designed for allow for improved identification and communication of the complex financial information common in corporate business reports. With the rise of XBRL, it would be valuable to allow users to map internal metadata to XBRL external metadata.

More generally, when copying and converting a set of data that is stored in one place in one format (the source) to another place in another format (the target), it is necessary to define a mapping between the internal metadata and the external metadata. In some cases, conversions are necessary on the data. These conversions may require the specification of mathematical operations to be performed on one or more items of internal data to produce one item of data for the metadata defined in the external source. The operation may be defined in terms of the internal metadata and the result of the operation mapped to the external metadata system.

What is needed is a solution that would allow users to establish mapping from internally defined and/or provided metadata to externally defined and/or provided metadata. Furthermore, adding an additional software package to generate such mappings could be confusing and time-consuming to the user. Therefore, what is also needed is a solution that provides a user interface for establishing such mappings in a report design environment.

Additionally, what is needed is a solution that would allow mappings to be defined just for the subset of metadata that needs to be mapped in order to perform the metadata conversion for a document, rather than requiring a user to map complete sets of meta-data between systems without regard to which data exists in the internal system and which data exists in the external system,

BRIEF DESCRIPTION

A solution is provided that allows a user to provide an alternate set of metadata for any number of data points within a report, while in a report design environment. They may lay down a grid on the work area and specify the data by placing the relevant dimensional metadata, extracted from the source, in the grid as row headings and column headings. The user may then select either a column or a row from the grid and upon doing so may be provided with a mechanism to define alternate metadata that can describe all data points that are in the column or row in the target system. This allows for a much more user-friendly environment in which to specify metadata mappings between internal sources and external sources.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
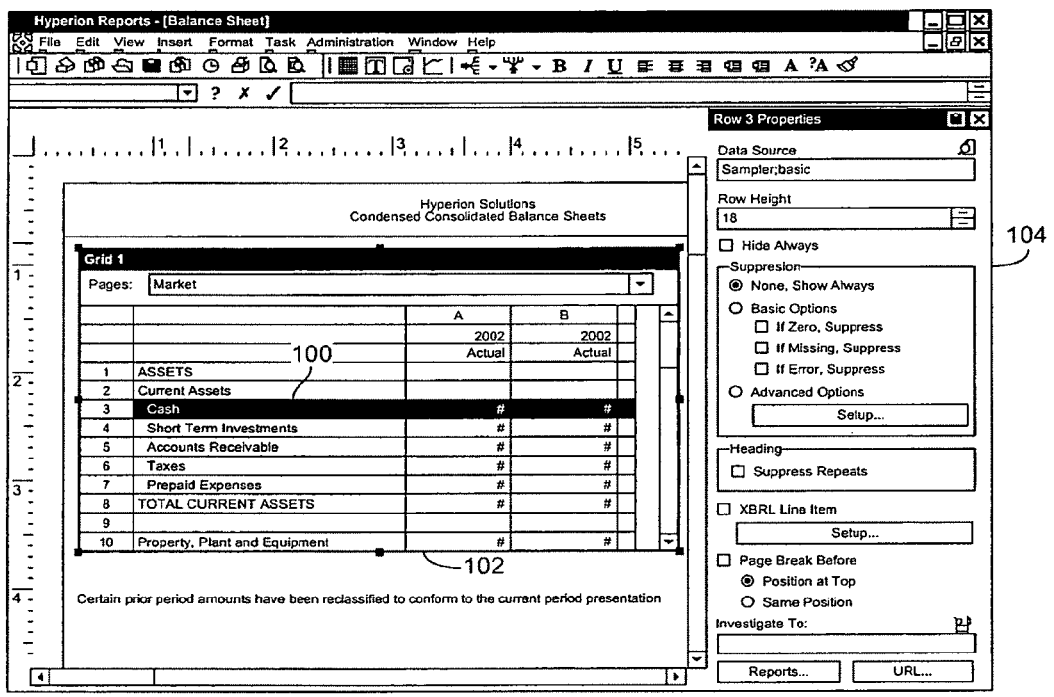
FIG. 1 is a screen capture illustrating selecting a row from a grid in accordance with an embodiment of the present invention.

Embodiments of the present invention are described herein in the context of a system of computers, servers, and software.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention allows a user to define the set of data or metadata that is to be output with an alternate set of metadata in the same way they define they layout of a report in a report design environment. They may lay down a grid or set of grids and/or individual fields (hereinafter collectively referred to in the singular as grid) on the work area and specify the data that is to be converted by placing the relevant dimensional metadata, extracted from the source, in the grid as row headings and column headings.

The user may then select either a column or a row from the grid and upon doing so may be provided with a mechanism to define metadata that can describe all data points that are in the column or row in the target system. Depending on the type of metadata to be mapped to, the user may be presented either with a list from which they can select a known item of metadata to map to in the external system, or a dialog or dialogs into which they can type specific metadata that should be created in the external system when the report is output for the external system. Certain types of metadata may have certain limitations in a particular external system, such as time related metadata representing dates or time periods, and the user in such cases may be presented with controls to enable them to select specific items of metadata from the possible range of values for that dimension which are not necessarily known in advance.

If there is no specific item of metadata in the internal system that maps to the metadata in the external system, but rather a data value must be calculated using a formula involving one or more data items in the internal system, a new column or row may be created in the grid and a formula may be entered into the new row or column which generates the desired data. The formula column or row may then be mapped to metadata in the external system in the manner described above.

If a specific cell or cells in the grid need to be mapped to different metadata in the external system than the mapping implied by the mappings of the row and/or column in which they are located in the grid, then they may be selected individually or as a group and the mappings inherited from the row or columns overridden using the method described above.

The mappings, once created, may then be stored as part of the report definition for later use.

FIGS. 1-13 are screen captures illustrating an example of an execution of an embodiment of the present invention.

Figure 2:
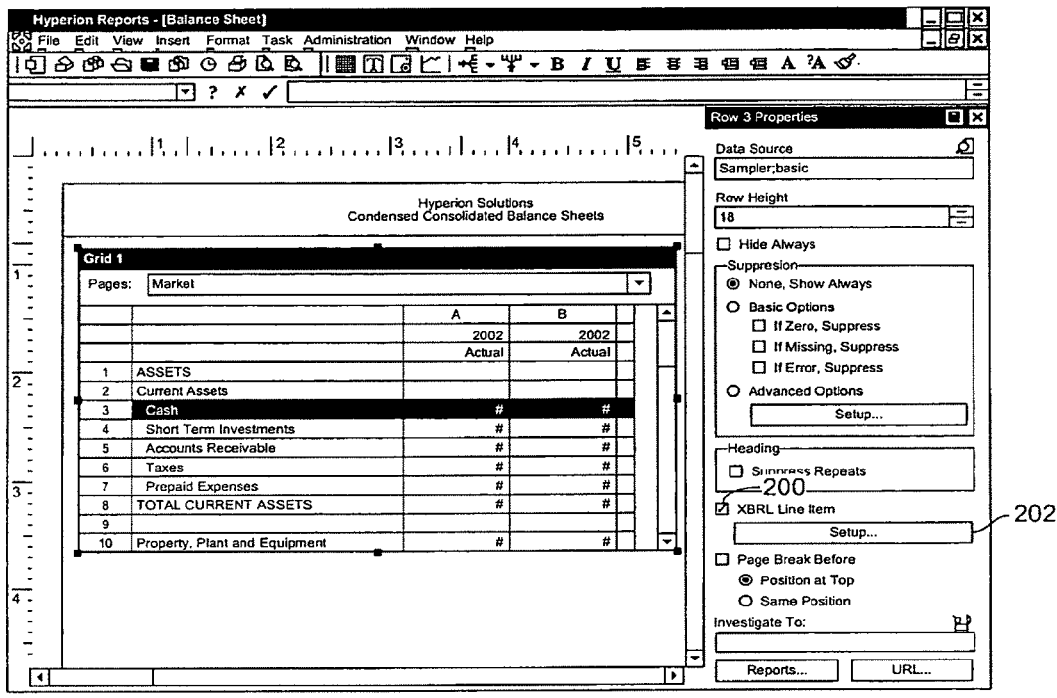
FIG. 2 is a screen capture illustrating selection of a line item checkbox in accordance with an embodiment of the present invention.

FIG. 1 is a screen capture illustrating selecting a row from a grid in accordance with an embodiment of the present invention. Here, a row 100 in the grid 102, the row 100 containing metadata that the user wishes to map to an external system. A properties window 104 may then appear, where the user is able to select properties for the row. Here, the user may wish to indicate that the row is mapped to an external system, such as an XBRL Line Item in this example. FIG. 2 is a screen capture illustrating selection of a line item checkbox in accordance with an embodiment of the present invention. As can be seen, the user has checked the checkbox 200. The user may then select the "setup" button.

Figure 3:
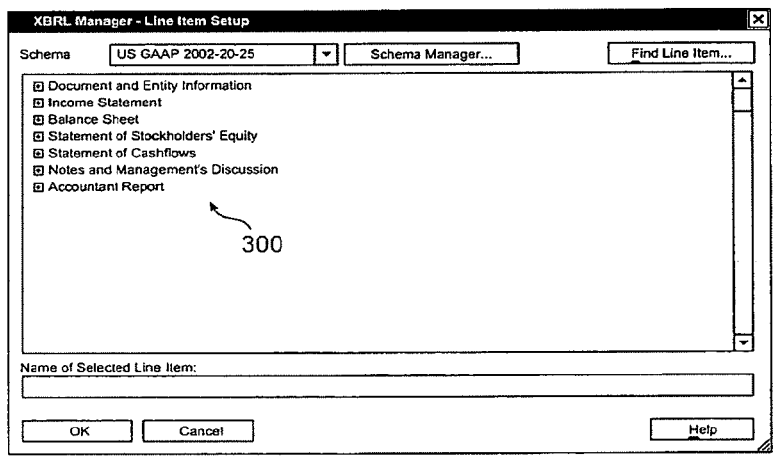
FIG. 3 is a screen capture illustrating a line item setup dialog in accordance with an embodiment of the present invention.
Figure 4:
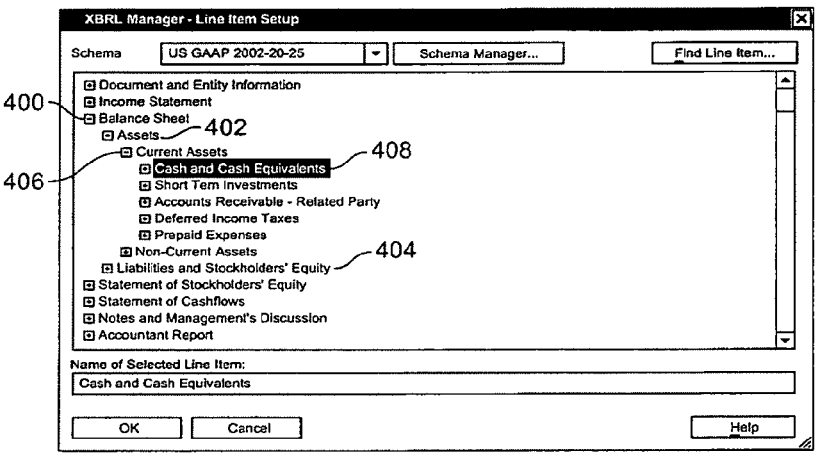
FIG. 4 is a screen capture illustrating a line item setup dialog where some hierarchy boxes have been selected in accordance with an embodiment of the present invention.

FIG. 3 is a screen capture illustrating the selection of external metadata in accordance with an embodiment of the present invention. Metadata 300 may be presented in a hierarchical format, with a user able to move down the hierarchy by selecting one or more hierarchy boxes. FIG. 4 is a screen capture illustrating the selection of external metadata in accordance with an embodiment of the present invention. Here, a line item setup dialog is provided where some hierarchy boxes have been selected. The user has clicked the "Balance Sheet" box 400, which presented further metadata of "Assets" 402 and "Liabilities and Stockholders' Equity" 404. The user has gone even further down the hierarchy by also selecting "Assets" 402, and then "Current Assets" 406. The user has selected on "Cash and Cash Equivalents" 408 as the external metadata to associate with the selected row in the grid.

Figure 5:
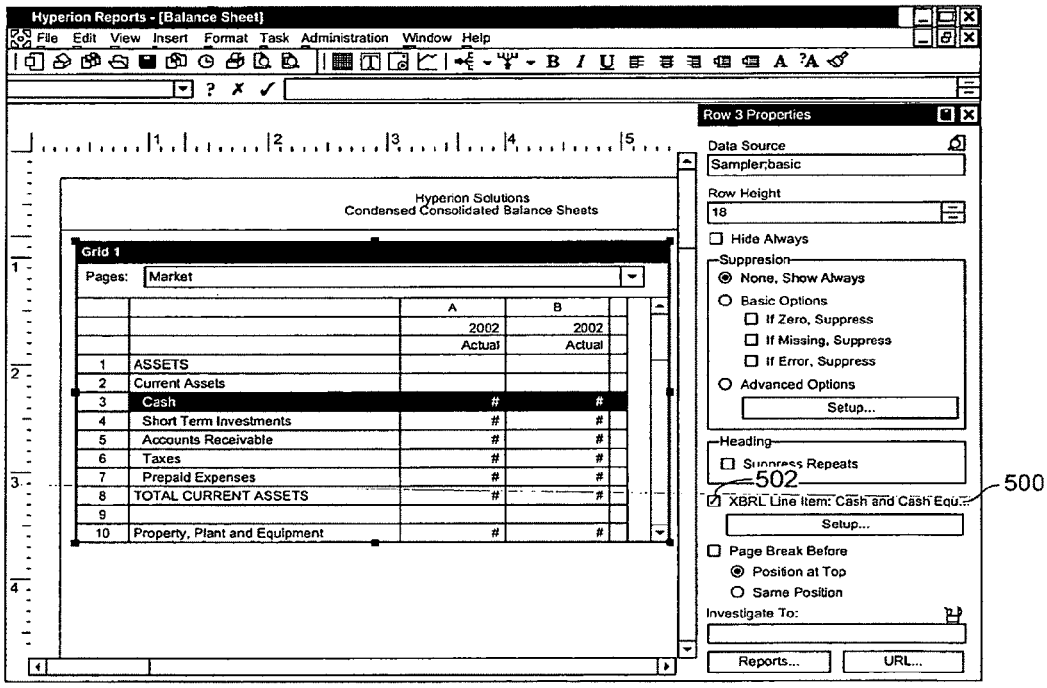
FIG. 5 is a screen capture illustrating the updated row properties window in accordance with an embodiment of the present invention.

FIG. 5 is a screen capture illustrating the updated row properties window in accordance with an embodiment of the present invention. Here, the details of the mapping 500 are displayed beside the checkbox 502.

Figure 6:
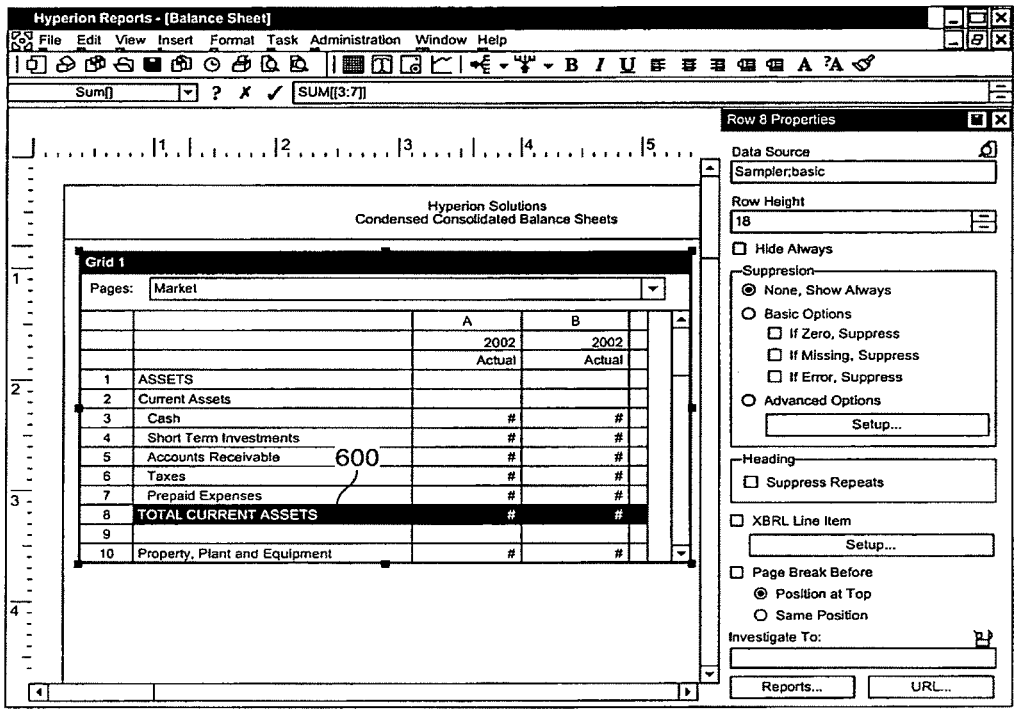
FIG. 6 is a screen capture illustrating the selection of a calculated row in accordance with an embodiment of the present invention.
Figure 7:
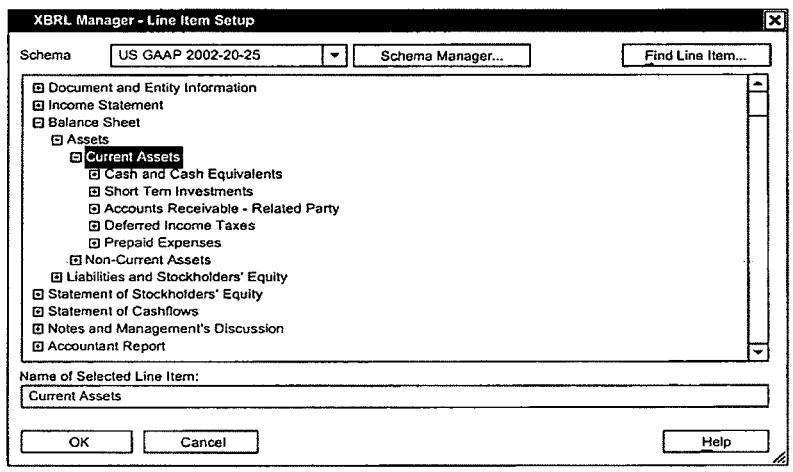
FIG. 7 is a screen capture illustrating a line item setup dialog for a selected calculated row in accordance with an embodiment of the present invention.

FIG. 6 is a screen capture illustrating the selection of a calculated row in accordance with an embodiment of the present invention. Here, the user has selected a row 600 for which there is no metadata in the internal systems. Calculations for this row are performed at output creation time. This may be mapped to an external system in the same way as any other row. FIG. 7 is a screen capture illustrating a line item setup dialog for a selected calculated row in accordance with an embodiment of the present invention.

Figure 8:
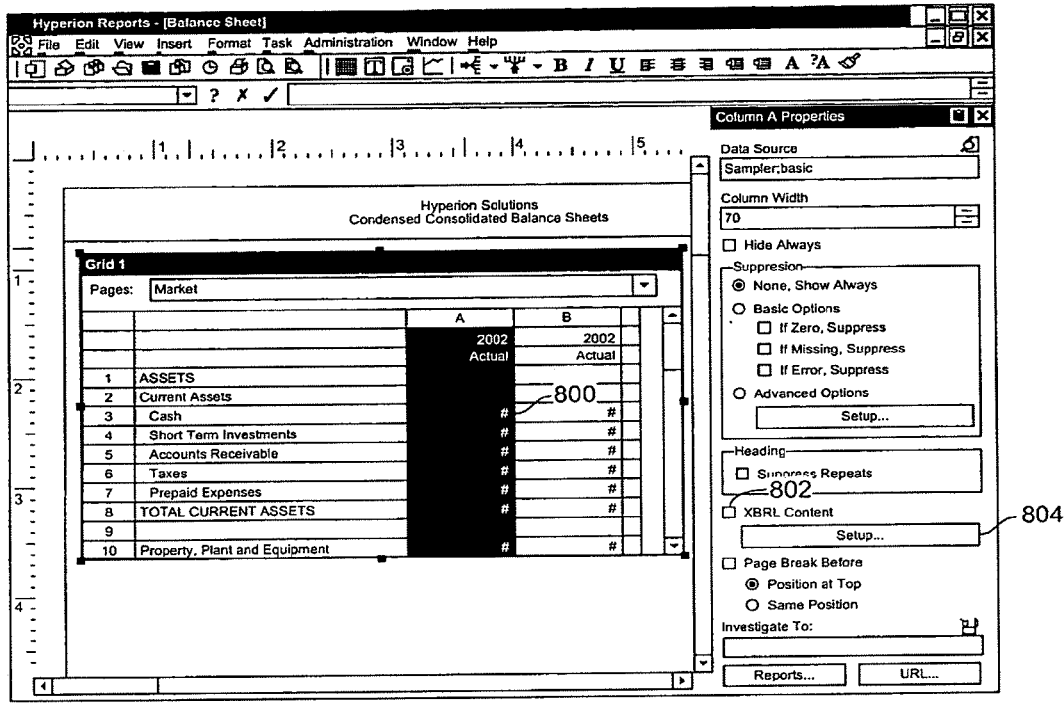
FIG. 8 is a screen capture illustrating the selection of a column for which metadata may be defined.
Figure 9:
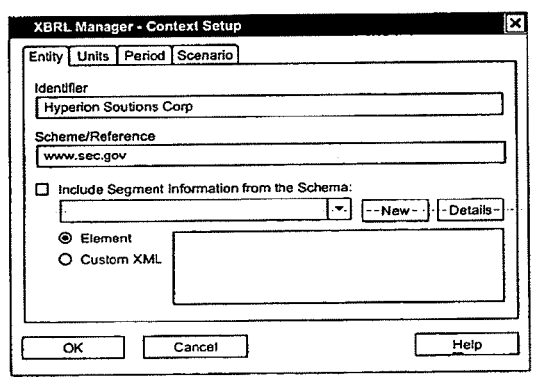
FIG. 9 is a screen capture illustrating the XBRL Manager-Context Setup dialog in accordance with an embodiment of the present invention.
Figure 10:
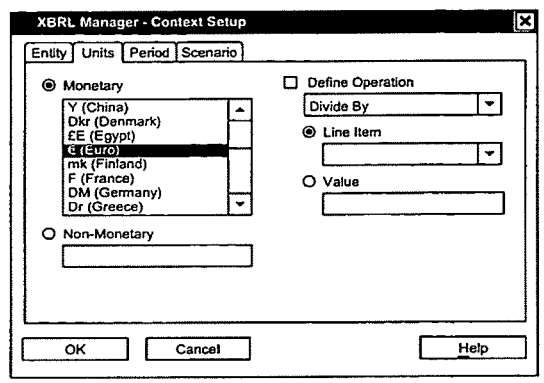
FIG. 10 is a screen capture illustrating an XBRL manager-Context Setup dialog when a Units tab is selected in accordance with an embodiment of the present invention.
Figure 11:
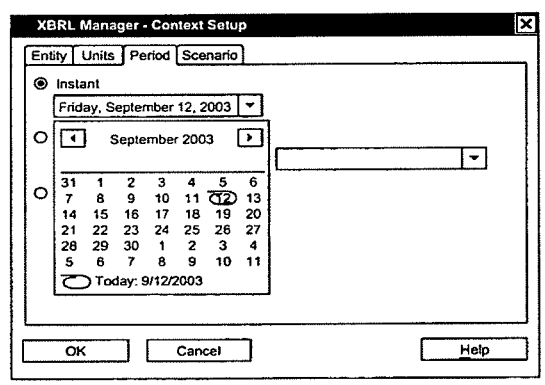
FIG. 11 is a screen capture illustrating an XBRL manager-Context Setup dialog when a Period tab is selected in accordance with an embodiment of the present invention.

FIG. 8 is a screen capture illustrating the selection of a column for which metadata may be defined. This is an example of where the external metadata is not presupplied but rather the format of the metadata is predefined. Thus, the user selects a column 800, then checks the "XBRL context" checkbox 802 to specify that external metadata will be attached to this column, then hits "setup" 804. FIG. 9 is a screen capture illustrating the XBRL Manager-Context Setup dialog in accordance with an embodiment of the present invention. Here, the user may fill in values according to the format that is predefined. In this external system, selections involve the Entity, Units, Period, and Scenario. FIG. 9 depicts the dialog when the Entity tab is selected. FIG. 10 is a screen capture illustrating an XBRL manager-Context Setup dialog when a Units tab is selected in accordance with an embodiment of the present invention. FIG. 11 is a screen capture illustrating an XBRL manager-Context Setup dialog when a Period tab is selected in accordance with an embodiment of the present invention.

Figure 12:
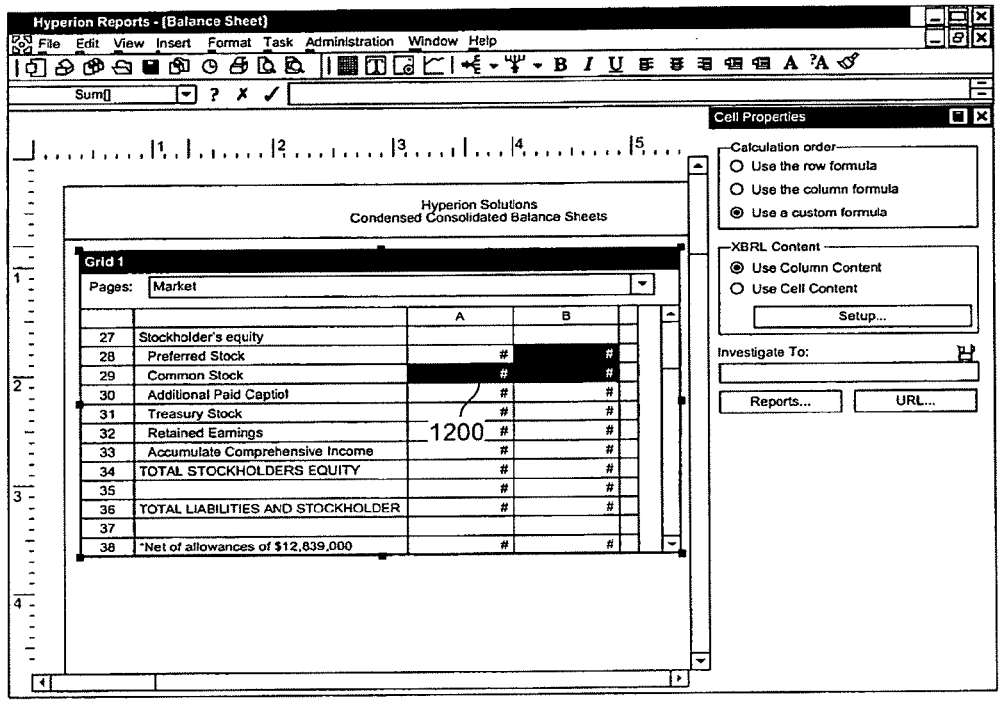
FIG. 12 is a screen capture illustrating the selection of individual cells from a grid in accordance with an embodiment of the present invention.
Figure 13:
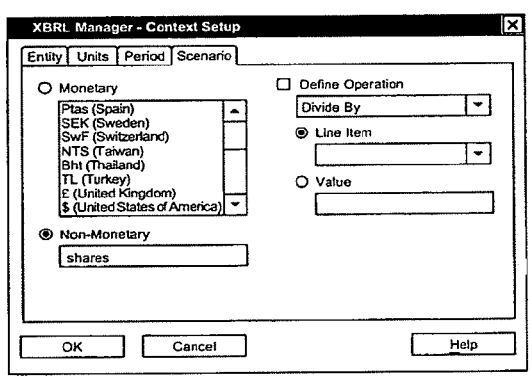
FIG. 13 is a screen capture illustrating the XBRL Manager-Context Setup Window for individual cell selections in accordance with an embodiment of the present invention.

FIG. 12 is a screen capture illustrating the selection of individual cells from a grid in accordance with an embodiment of the present invention. Here, the user has selected cells 1200 whose previous mappings should be overruled. FIG. 13 is a screen capture illustrating the XBRL Manager-Context Setup Window for individual cell selections in accordance with an embodiment of the present invention. This window is similar to the XBRL Manager-Context Setup Window described earlier.

Figure 14:
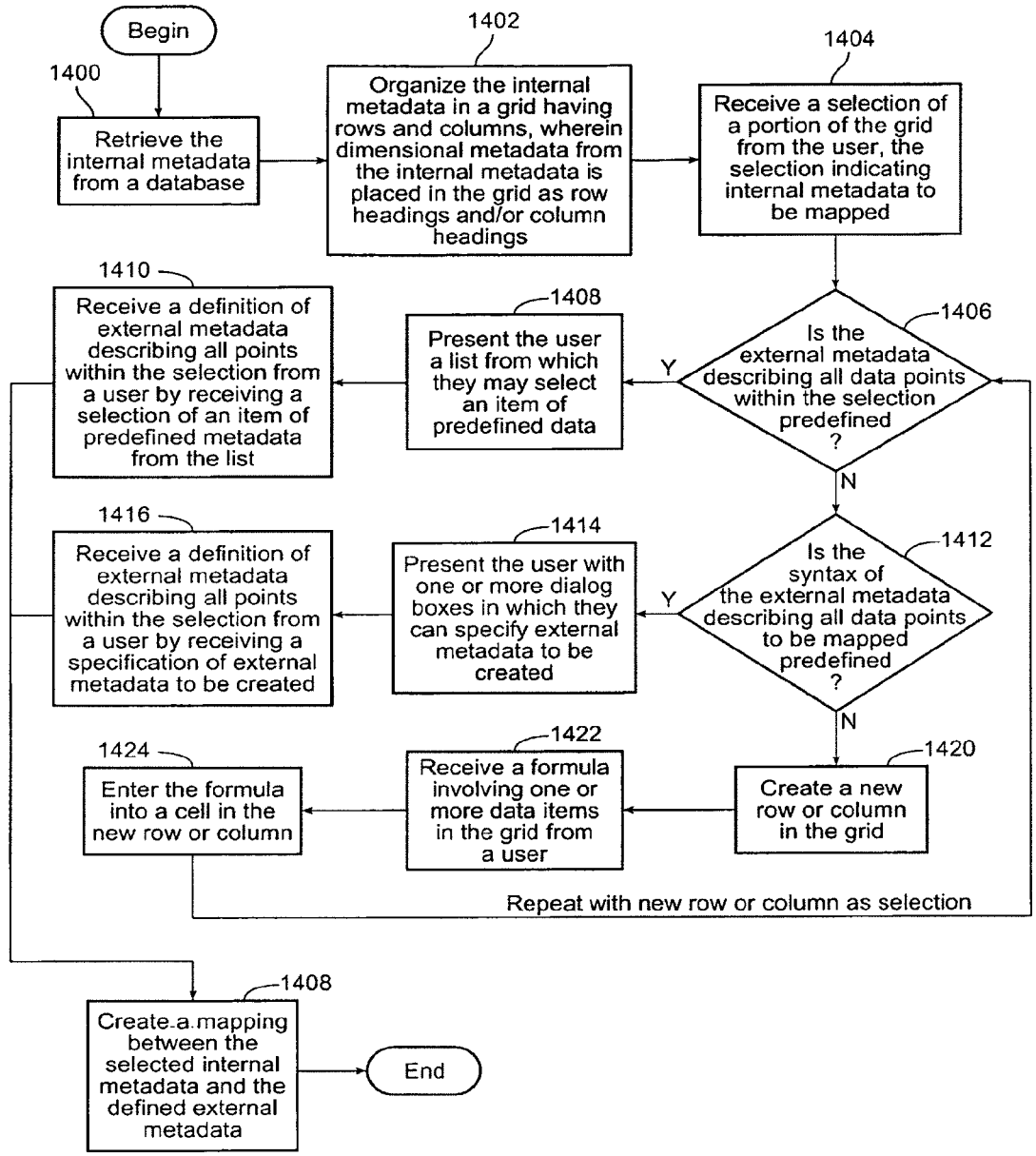
FIG. 14 is a flow diagram illustrating a method for establishing a mapping between internal metadata and external metadata in a report design environment in accordance with an embodiment of the present invention.

FIG. 14 is a flow diagram illustrating a method for establishing a mapping between internal metadata and external metadata in a report design environment in accordance with an embodiment of the present invention. In one embodiment, the external metadata may be XBRL metadata. The external metadata source may be specified using a schema registration. At 1400, internal metadata may be retrieved from a database. At 1402, the internal metadata may be organized in a grid having rows and columns, wherein dimensional metadata from the internal metadata is placed in the grid as row headings and/or column headings. At 1404, a selection of a portion of the grid may be received from a user, the selection indicating internal metadata to be mapped. The selection may be one or more rows, one or more columns, or one or more individual cells in the grid. At 1406 it may be determined if the external metadata describing all data points within the selection is predefined. If so, then at 1408 the user may be presented a list from which they may select an item of predefined data. The list may be provided in a tree control. Then at 1410, a definition of external metadata describing all points within the selection may be received from the user by receiving a selection of an item of predefined metadata from the list. If the external metadata describing all data points within the selection is not predefined, then at 1412, it may be determined if the syntax of the external metadata describing all data points within the selection is predefined. If so, then at 1414 the user may be presented with one or more dialog boxes in which they can specify external metadata to be created. The user may specify an entity, units, periods, and/or scenarios for the external metadata to be created in the dialog box. A control for the dialog box may be a tree control when an element button is selected and a text field when a custom button is selected. Then at 1416, a definition of external metadata describing all points within the selection may be received from the user by receiving a specification of external metadata to be created. At 1418, a mapping may be created between the selected internal metadata and the defined external metadata. This mapping may overwrite preexisting mappings for rows or columns containing the selection.

If at 1412, it is determined that the syntax of the external metadata describing all points to be mapped is not predefined, then the case is one where a data value should be calculated using a formula involving one or more data items in the source system. In this case, at 1420, a new row or column may be created in the grid. Then at 1422, a formula involving one or more data items in the grid may be received from the user. At 1424, the formula may be entered into a cell in the new row or column. Then the process may return to 1406 so that the user may then specify a definition of external metadata describing the new row or column (which is now the selection).

Figure 15:
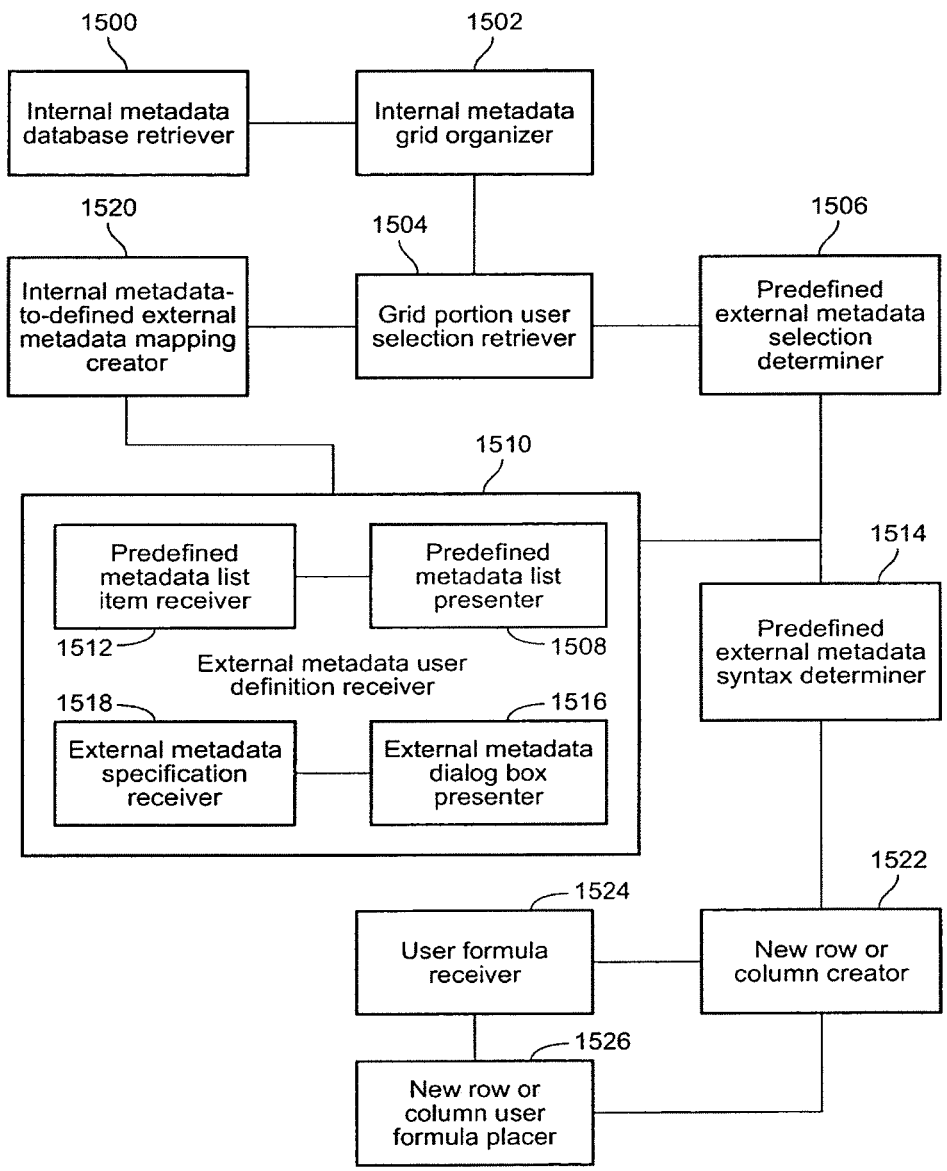
FIG. 15 is a block diagram illustrating an apparatus for establishing a mapping between internal metadata and external metadata in a report design environment in accordance with an embodiment of the present invention.

FIG. 15 is a block diagram illustrating an apparatus for establishing a mapping between internal metadata and external data in a report design environment in accordance with an embodiment of the present invention. In one embodiment, the external metadata may be XBRL metadata. The external metadata source may be specified using a schema manager. An internal metadata database retriever 1500 may retrieve internal metadata from a database. An internal metadata grid organizer 1502 coupled to the internal metadata database retriever 1500 may organize the internal metadata in a grid having rows and columns, wherein dimensional metadata from the internal metadata is placed in the grid as row headings and/or column headings. A grid portion user selection receiver 1504 coupled to the internal metadata grid organizer 1502 may receive a selection of a portion of the grid from a user, the selection indicating internal metadata to be mapped. The selection may be one or more rows, one or more columns, or one or more individual cells in the grid. A predefined external metadata selection determiner 1506 may determine if the external metadata describing all data points within the selection is predefined. If so, then a predefined metadata list presenter 1508 in an external metadata user definition receiver 1510 coupled to the grid portion user selection receiver may present the user a list from which they may select an item of predefined data. The list may be provided in a tree control. Then a predefined metadata list item receiver 1512 coupled to the predefined metadata list presenter 1508 may receive a definition of external metadata describing all points within the selection from the user by receiving a selection of an item of predefined metadata from the list. If the external metadata describing all data points within the selection is not predefined, then a predefined external metadata syntax determiner 1514 coupled to the external metadata user definition receiver 1510 may determine if the syntax of the external metadata describing all data points within the selection is predefined. If so, then an external metadata dialog box presenter 1516 may present the user with one or more dialog boxes in which they can specify external metadata to be created. The user may specify an entity, units, periods, and/or scenarios for the external metadata to be created in the dialog box. A control for the dialog box may be a tree control when an element button is selected and a text field when a custom button is selected. Then an external metadata specification receiver 1518 coupled to the external metadata dialog box presenter 1516 may receive a definition of external metadata describing all points within the selection may be received from the user by receiving a specification of external metadata to be created. An internal metadata-to-defined external metadata mapping creator 1520 coupled to the external metadata user definition receiver 1510 and to the grid portion user selection receiver 1504 may create a mapping between the selected internal metadata and the defined external metadata. This mapping may overwrite preexisting mappings for rows or columns containing the selection.

If it is determined that the syntax of the external metadata describing all points to be mapped is not predefined, then the case is one where a data value should be calculated using a formula involving one or more data items in the source system. In this case, a new row or column creator 1522 coupled to the internal metadata grid organizer 1502 may create a new row or column in the grid. Then, a user formula receiver 1524 coupled to the predefined external metadata syntax determiner 1514 and to the new row or column creator 1522 may receive a formula involving one or more data items in the grid from the user. A new row or column user formula placer 1526 coupled to the new row or column creator 1522 and to the user formula receiver 1524 may place the formula into a cell in the new row or column. Then the process may loop so that the user may then specify a definition of external metadata describing the new row or column (which is now the selection).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for establishing a mapping between internal metadata and external metadata within a report design environment, the method comprising:
   reading, by a computer system, metadata from a database that describes data stored in the database to create the internal metadata within the report design environment;
   presenting, by the computer system, the internal metadata within a report layout visual design area of the report design environment as a set of data points within a grid having row and/or column headings determined by dimensional metadata from the internal metadata;
   receiving, by the computer system, a first selection of a portion of the grid;
   determining, by the computer system, whether external metadata describing all data points within said first selection is predefined;
   presenting a list of predefined metadata based on determining that the external metadata describing all data points within said first selection is predefined;
   determining, by the computer system, whether a syntax of external metadata describing all data points within said first selection is predefined based on determining that the external metadata for said first selection is not predefine;
   requesting, by the computer system, a specification of external metadata to be created based on determining that the syntax of external metadata describing all data points within said first selection is predefined
   based on determining that neither external metadata describing all data points within said first selection is predefined nor a syntax of external metadata describing all data points within said first selection is predefined:
      creating, by the computer system, new internal metadata as a new row or column in the grid,
      receiving, by the computer system, a formula involving one or more data points within the first selection,
      configuring, by the computer system, a cell in one of the new row or column of the grid with the formula involving the one or more data points within the first selection
   and
   creating, by the computer system, a mapping between the internal metadata represented by the set of data points within the grid and the external metadata selected or specified for data points within the first selection.

2. The method of claim 1, further comprising receiving an entity for said external metadata to be created.

3. The method of claim 1, further comprising receiving units for said external metadata to be created.

4. The method of claim 1, further comprising receiving a time period for said external metadata to be created.

5. The method of claim 1, further comprising receiving a scenario for said external metadata to be created.

6. The method of claim 1, wherein said first selection comprises one or more rows in said grid.

7. The method of claim 1, wherein said first selection comprises one or more columns in said grid.

8. The method of claim 1, wherein said first selection comprises one or more individual cells in said grid, wherein said one or more individual cells do not comprise an entire row or an entire column.

9. The method of claim 1, wherein creating, by the computer system, the mapping between the internal metadata represented by the set of data points within the grid and the external metadata selected or specified for all data points within the first selection comprises overriding preexisting mappings for rows or columns containing said first.

10. The method of claim 1, wherein said external metadata is Extensible Business Reporting Language (XBRL) metadata.

11. The method of claim 1, wherein an external metadata source is specified using a schema manager.

12. The method of claim 1 wherein the internal metadata describes data, contained in the database, from which a report is to be generated.

13. A method for establishing within a report design environment a mapping between internal metadata stored in a database and external metadata, the method comprising:
   reading, by a computer system, the internal metadata from the database;
   presenting, by the computer system, the internal metadata within a report layout visual design area of the report design environment as a set of data points within a grid having row and/or column headings determined by dimensional metadata from the internal metadata;
   receiving, by the computer system, a first selection a portion of the grid having one or more data points of internal metadata to be mapped to external metadata;
   presenting, by the computer system, a list of predefined metadata based on a determination that external metadata describing all data points within said first selection is predefined;
   requesting, by the computer system, a specification of external metadata to be created based on a determination that the syntax of external metadata describing all data points within said first selection is predefined;
   creating, by the computer system, a mapping between the internal metadata represented by the set of data points within the grid and the external metadata selected or created for data points within the first selection;
   receiving, by the computer system, a formula involving one or more data points within said grid;
   creating, by the computer system, a new row or column in said grid having a new data point in one of said new row or column of the grid with said formula; and
   creating, by the computer system, a mapping between new internal metadata represented by the new data point and external metadata for the new data point selected from a list of predefined metadata or created from one or more specifications of external metadata to be created.

14. The method of claim 13 wherein:
   the internal metadata describes data, contained in the database, from which a report is to be generated.

15. An apparatus that establishes within a report design environment a mapping between internal metadata stored in a database and external metadata, the apparatus comprising:
   a processor; and
   a memory configured to store a set of instructions including:
      means for reading the internal metadata from the database;
      an internal metadata grid organizer presenting the internal metadata within a work area of the report design environment within one or more cells of a grid having row and/or column headings determined by dimensional metadata from the internal metadata read from the database;

means for receiving a selection of a portion of the grid indicating one or more cells of the grid containing internal metadata to be mapped to external metadata in an external system;

means for determining the internal metadata of the grid that corresponds to the one or more cells, the internal metadata corresponding to the one or more cells forming a subset of the internal metadata associated with the grid;

means for receiving a definition of predefined external metadata based on a determination that all external metadata of the selection is predefined;

means for receiving a definition of external metadata based on a determination that a syntax for all external metadata of the selection is predefined;

means for creating a new row or column within the selection based on a determination that the syntax for all external metadata of the selection is not predefined; and means for creating a cell in the new row or column with a formula involving one or more data points within the grid.

16. The apparatus of claim 15 wherein:
the internal metadata describes data, contained in the database, from which a report is to be generated.

17. A non-transitory machine-readable medium for a computer system, the non-transitory machine-readable medium having stored thereon a series of instructions executable by a processor to cause the computer system to establish a mapping between internal metadata and external metadata within a report design environment, the series of instructions comprising:

instructions that cause the processor to read metadata from database that describes data stored in the database to create the internal metadata within the report design environment;

instructions that cause the processor to present the internal metadata within a report layout visual design area of the report design environment as a set of data points within a grid having row and/or column headings determined by dimensional metadata from the internal metadata, instructions that cause the processor to receive a selection of a portion of the grid indicating one or more cells of the grid;

instructions that cause the processor to determine the internal metadata of the grid that corresponds to the one or more cells, the internal metadata corresponding to the one or more cells forming a subset of the internal metadata associated with the grid;

instructions that cause the processor to receive a definition of predefined external metadata based on a determination that all external metadata of the selection is predefined;

instructions that cause the processor to determine whether a syntax of external metadata describing all data points within said selection is predefined;

instructions that cause the processor to request a definition of external metadata based on a determination that the syntax of the external metadata describing all data points within said selection is predefined;

instructions that cause the processor, based on a determination that the external metadata describing all data points within said selection is not predefined and the syntax of the external metadata describing all data points within said selection is not predefined, to:
receive a formula involving one or more data points in said grid,
instructions that cause the processor to create a new row or column in said grid, and
instructions that cause the processor to configure a cell in said new row or column with said formula involving the one or more data points in said selection.

18. The non-transitory machine-readable medium of claim 17, the method further comprising instructions that cause the processor to receive an entity for said external metadata to be created.

19. The non-transitory machine-readable medium of claim 17, the method further comprising instructions that cause the processor to receive units for said external metadata to be created.

20. The non-transitory machine-readable medium of claim 17, the method further comprising instructions that cause the processor to receive a time period for said external metadata to be created.

21. The non-transitory machine-readable medium of claim 17, the method further comprising instructions that cause the processor to receive a scenario for said external metadata to be created.

22. The non-transitory machine-readable medium of claim 17, wherein said selection comprises one or more rows in said grid.

23. The non-transitory machine-readable medium of claim 17, wherein said selection comprises one or more columns in said grid.

24. The non-transitory machine-readable medium of claim 17, wherein said selection comprises one or more individual cells in said grid.

25. The non-transitory machine-readable medium of claim 24, wherein preexisting mappings for rows or columns containing said selection are overwritten for said one or more individual cells.

26. The non-transitory machine-readable medium of claim 17, wherein said external metadata is Extensible Business Reporting Language (XBRL) metadata.

27. The non-transitory machine-readable medium of claim 17, wherein an external metadata source is specified using a schema manager.

* * * * *

UNITED STATES PATENT AND TRADEMARK OFFICE
CERTIFICATE OF CORRECTION

PATENT NO.       : 8,966,357 B2  
APPLICATION NO.  : 13/044146  
DATED            : February 24, 2015  
INVENTOR(S)      : Paul Tangen et al.

Page 1 of 1

It is certified that error appears in the above-identified patent and that said Letters Patent is hereby corrected as shown below:

In the specification

Column 1, line 30:   Replace "Lanugage" with --Language--

Column 1, line 61:   Replace "," with --.--

Column 3, line 64:   Replace "a the" with --a--

In the claims

Column 8, line 10:   Replace "containing said first." with --containing said first selection.--

Signed and Sealed this  
Fifth Day of April, 2016

Michelle K. Lee  
*Director of the United States Patent and Trademark Office*